(12) United States Patent
Nakamura et al.

(10) Patent No.: US 8,328,231 B2
(45) Date of Patent: Dec. 11, 2012

(54) SIDE AIRBAG DEVICE FOR VEHICLE SEAT

(75) Inventors: Minoru Nakamura, Fuchu-cho (JP); Yoshinori Shinoda, Hiroshima (JP)

(73) Assignees: Delta Kogyo Co., Ltd. (JP); Newfrey LLC., Newark, DE (US)

(*) Notice: Subject to any disclaimer, the term of this patent is extended or adjusted under 35 U.S.C. 154(b) by 62 days.

(21) Appl. No.: 12/873,037

(22) Filed: Aug. 31, 2010

(65) Prior Publication Data

US 2011/0057426 A1  Mar. 10, 2011

(30) Foreign Application Priority Data

Sep. 7, 2009  (JP) .................................. 2009-205641

(51) Int. Cl.
 *B60R 21/20* (2011.01)
 *B60R 21/207* (2006.01)
(52) U.S. Cl. .................. 280/730.2; 280/728.2
(58) Field of Classification Search ............... 280/728.2, 280/728.3, 730.1, 730.2; 297/216.13
See application file for complete search history.

(56) References Cited

U.S. PATENT DOCUMENTS

| | | | | |
|---|---|---|---|---|
| 5,333,897 | A * | 8/1994 | Landis et al. ............... | 280/728.2 |
| 5,667,243 | A | 9/1997 | Fisher et al. | |
| 5,762,363 | A * | 6/1998 | Brown et al. ............... | 280/730.2 |
| 5,913,536 | A | 6/1999 | Brown | |
| 6,007,091 | A * | 12/1999 | Westrich ..................... | 280/730.2 |
| 6,045,151 | A * | 4/2000 | Wu ............................. | 280/728.3 |
| 6,065,772 | A | 5/2000 | Yamamoto et al. | |
| 6,206,410 | B1 * | 3/2001 | Brown ......................... | 280/728.3 |
| 6,237,934 | B1 * | 5/2001 | Harrell et al. ............... | 280/728.3 |
| 6,352,304 | B1 * | 3/2002 | Sorgenfrei ............... | 297/216.13 |
| 6,478,329 | B1 | 11/2002 | Yokoyama | |
| 6,883,828 | B2 * | 4/2005 | Ohki ........................... | 280/730.2 |
| 7,322,597 | B2 * | 1/2008 | Tracht ......................... | 280/728.3 |
| 7,393,005 | B2 * | 7/2008 | Inazu et al. ................. | 280/730.2 |
| 7,562,902 | B2 * | 7/2009 | Osterhout ................... | 280/730.2 |
| 7,654,612 | B2 * | 2/2010 | Tracht et al. ............... | 297/216.13 |
| 7,677,596 | B2 * | 3/2010 | Castro et al. ............... | 280/730.2 |
| 2006/0113768 | A1 | 6/2006 | Tracht et al. | |
| 2007/0085305 | A1 * | 4/2007 | Feller et al. ................. | 280/728.2 |
| 2009/0020988 | A1 | 1/2009 | Sato et al. | |
| 2010/0295272 | A1 * | 11/2010 | Aoki ........................... | 280/728.2 |

FOREIGN PATENT DOCUMENTS

JP  2848482  1/1999
WO  WO 2009063715 A1 *  5/2009

* cited by examiner

*Primary Examiner* — Toan To
*Assistant Examiner* — James English
(74) *Attorney, Agent, or Firm* — Gerald E. Hespos; Michael J. Porco (57) ABSTRACT

A side airbag device for a vehicle seat comprises an inner connection member having a clip hole in an inner end portion thereof, an outer connection member having a clip hole in an inner end portion thereof, and a clip inserted in the respective clip holes of the inner and outer connection members and a clip-locking hole of a seat frame. The clip is inserted in the clip holes of the inner and outer connection members under a condition that the inner end portion of the inner connection member and the inner end portion of the outer connection member are overlapped on each other to allow the clip hole of the inner connection member and the clip hole of the outer connection member to be aligned with each other. The clip is locked to the clip-locking hole.

7 Claims, 7 Drawing Sheets

SIDE AIRBAG DEVICE FOR VEHICLE SEAT

BACKGROUND OF THE INVENTION

1. Field of the Invention

The present invention relates to a side airbag device for a vehicle seat.

2. Description of the Related Art

Figure 7A:
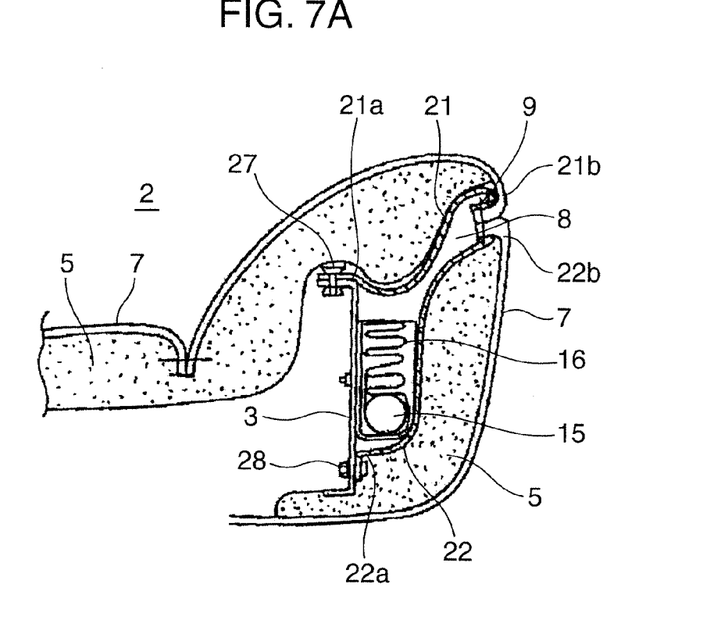
FIG. 7A is a sectional view showing a conventional side airbag device in a state before an airbag is inflated and developed.

Heretofore, a side airbag device for a vehicle seat has been known. As shown in FIG. 7A, the side airbag device is provided in a seat back 2 of the vehicle seat. The vehicle seat includes a seat frame 3, a pad 5 provided to surround the seat frame 3, and a skin 7 covering the pad 5. The side airbag device comprises a gas generator 15 attached to the seat frame 3, an airbag 16 adapted to be inflated by a gas from the gas generator 15, and two connection members 21, 22 each connecting the seat frame 3 and the skin 7 (see, for example, JP 2848482B).

Figure 7B:
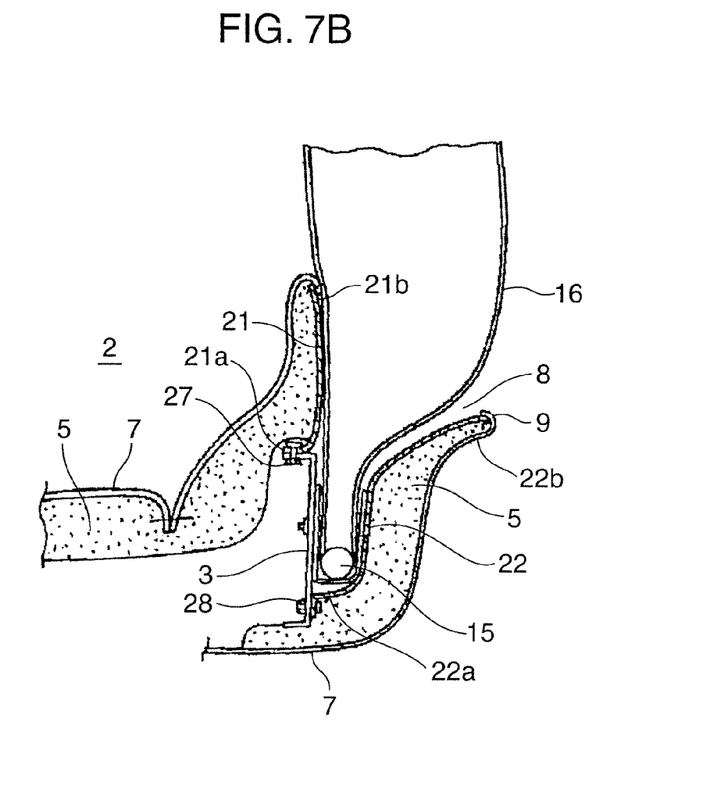
FIG. 7B is a sectional view showing the conventional side airbag device in a state after the airbag is inflated and developed.

As shown in FIG. 7B, during inflation by the gas from the gas generator 15, the airbag 16 pushes the pad 5 by an inflation pressure thereof, to break a sewn portion 9 of the skin 7. Then, the air bag 16 is developed outside the seat back 2 through a slit 8 provided in the pad 5 in a lateral portion of the seat back 2.

Each of the connection members 21, 22 is made of a material (e.g., woven fabric) which is flexible, low in stretchability and excellent in tensile strength, and formed in an elongate strip shape. An inner end portion 21a of the connection member 21 and an inner end portion 22a of the connection member 22 are fixed to the seat frame 3 by a bolt/nut set 27 and a bolt/nut set 28, respectively. Further, an outer end portion 21b of the connection member 21 and an outer end portion 22b of the connection member 22 are fixed to the sewn portion 9 of the skin 7, individually. The outer end portions 21b, 22b of the connection members 21, 22 are attached to the sewn portion 9 of the skin 7 in this manner, so that, when the airbag 16 is inflated to break the sewn portion 9 of the skin 7, and developed outside the seat back 2, the connection members 21, 22 can prevent a front portion of the pad 5 from being torn apart.

In the side airbag device disclosed in the JP 2848482B, during assembling of the device, it is necessary to perform an operation of fixing the inner end portions 21a, 22a of the connection members 21, 22 to the seat frame 3 using the two bolt/nut sets 27, 28, individually. Thus, the above side airbag device has a problem that it takes a lot of time and effort for the fixing operation using the two bolt/nut sets.

SUMMARY OF THE INVENTION

It is an object of the present invention to provide a side airbag device for a vehicle seat, which is capable of fixing respective inner end portions of two connection members to a seat frame with ease.

A side airbag device of the present invention is used in a seat for a vehicle, wherein the seat includes: a seat frame; a pad having a receiving space and a slit and attached to the seat frame; and a skin having a sewn portion and covering a surface of the pad. The side airbag device comprises a gas generator, an airbag, an inner connection member, an outer connection member, and a clip. The seat frame has a clip-locking hole.

The airbag is attached to the seat frame. The airbag is received in the receiving space. The airbag is adapted to be inflated and deployed outwardly from the receiving space through the slit by a gas from the gas generator, to break the sewn portion.

The inner connection member has an inner end portion fixed to the seat frame and an outer end portion fixed to the sewn portion. The inner connection member is installed to extend through a region inward of the airbag in a widthwise direction of the vehicle. The inner connection member is formed with a clip hole in the inner end portion thereof.

The outer connection member has an inner end portion fixed to the seat frame and an outer end portion fixed to the sewn portion. The outer connection member is installed to extend through a region outward of the airbag in the widthwise direction of the vehicle. The outer connection member is formed with a clip hole in the inner end portion thereof.

The clip is inserted in the respective clip holes of the inner and outer connection members and the clip-locking hole of the seat frame, under a condition that the inner end portion of the inner connection member and the inner end portion of the outer connection member are overlapped on each other to allow the clip hole of the inner connection member and the clip hole of the outer connection member to be aligned with each other. The clip is locked to the clip-locking hole.

DETAILED DESCRIPTION OF THE PREFERRED EMBODIMENTS

Figure 1:
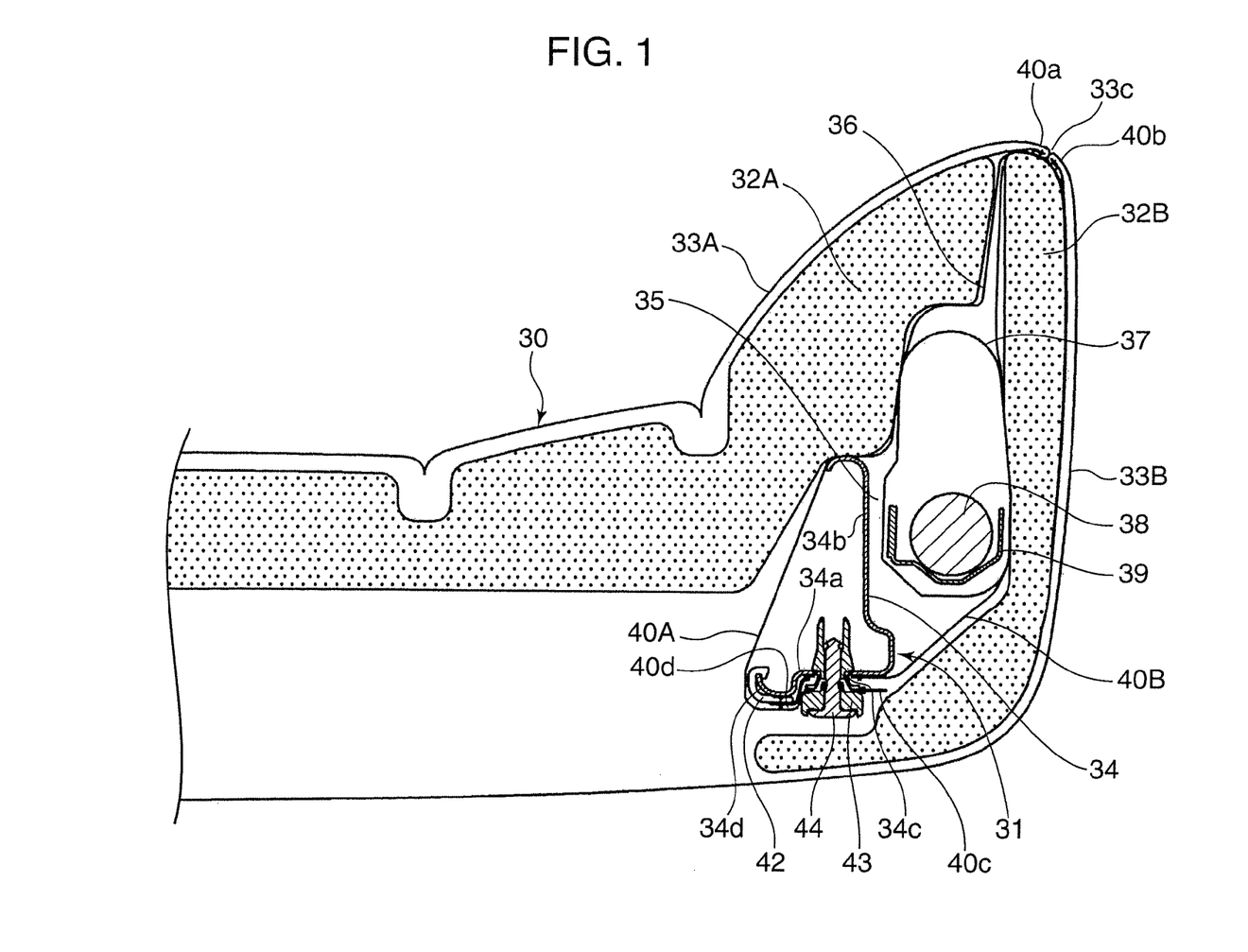
FIG. 1 is a horizontal sectional view showing a side airbag device according to one embodiment of the present invention.
Figure 2:
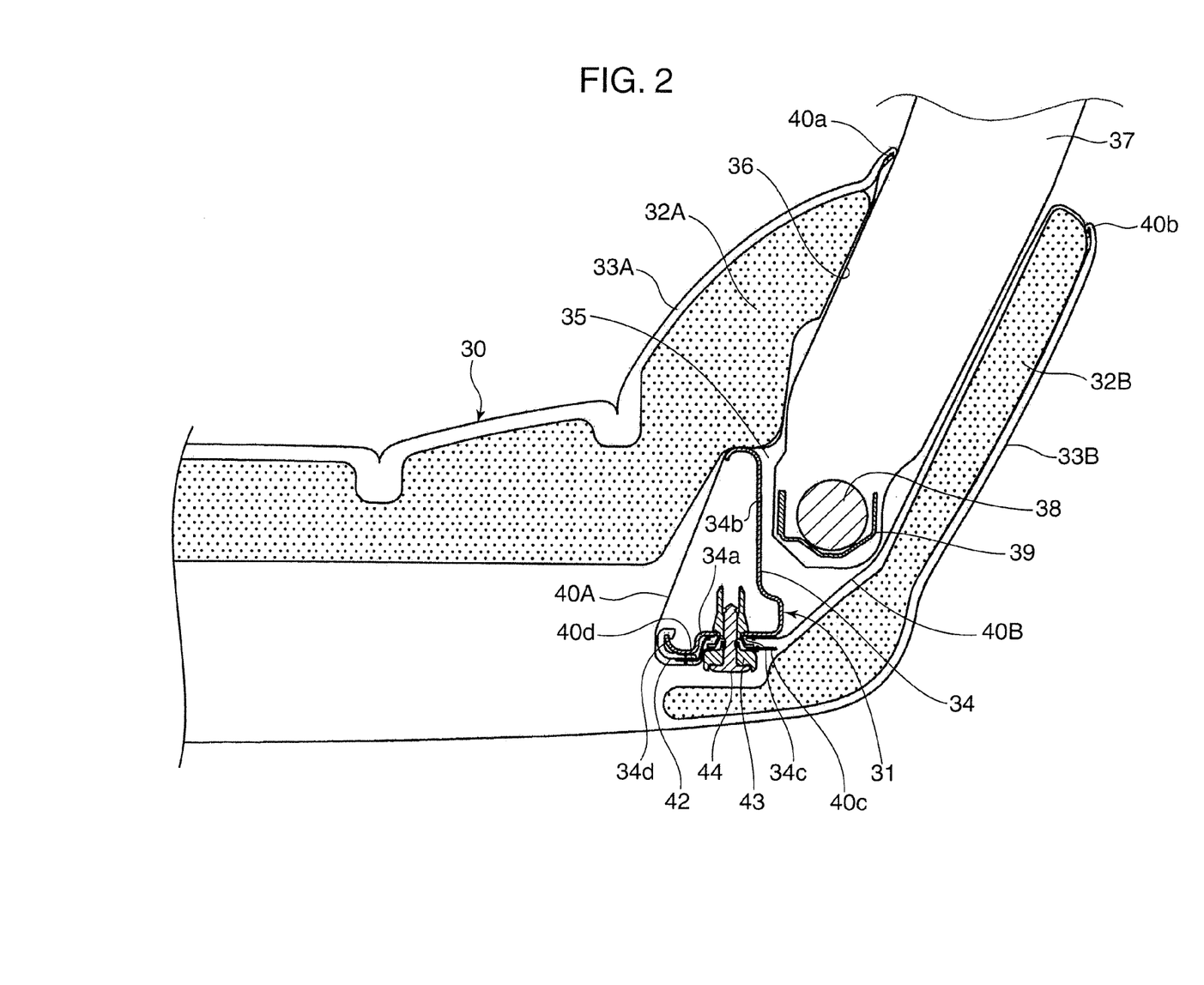
FIG. 2 is a horizontal sectional view of the side airbag device in FIG. 1, in a state after an airbag is inflated and developed.
Figure 3:
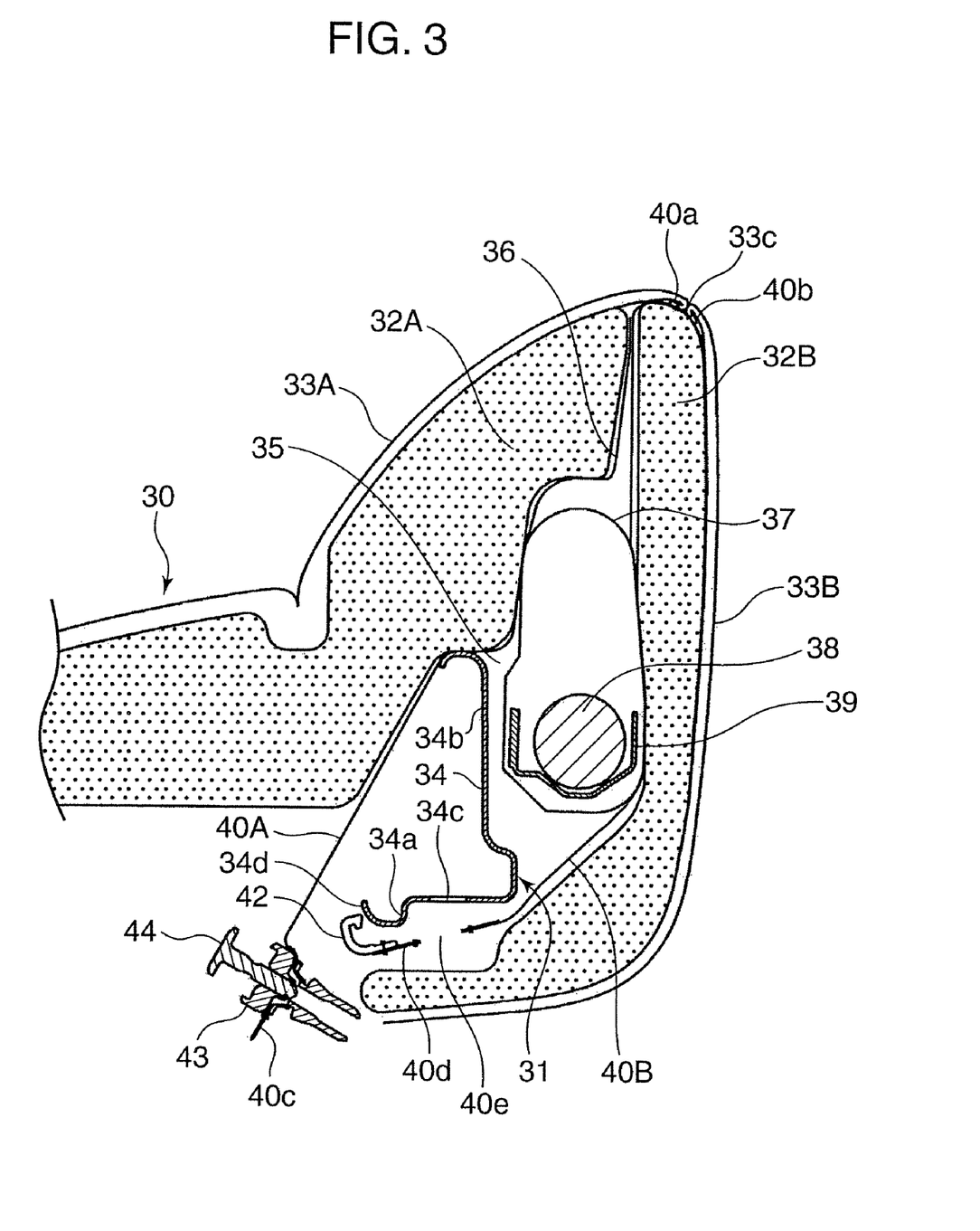
FIG. 3 is a horizontal sectional view of the side airbag device in FIG. 1, in a state before an inner end portion of an outer connection member and an inner end portion of an inner connection member are connected to a seat frame.

With reference to the drawings, a side airbag device for a vehicle seat, according to one embodiment of the present invention, will now be specifically described. FIG. 1 is a horizontal sectional view showing the side airbag device according to this embodiment. This side airbag device is provided in a right portion of a seat back 30. FIG. 2 is a horizontal sectional view of the side airbag device in FIG. 1, in a state after an airbag 37 is inflated and developed. Although this embodiment is illustrated based on an example where the side airbag device is provided in the seat back 30, the side airbag device may be provided in a seat cushion (not shown).

The seat back 30 comprises a seat frame 31, a cushioning pad 32 provided to surround the seat frame 31, and a skin (trim) 33 covering the pad 32. The skin 33 includes an after-mentioned front skin 33A and an after-mentioned lateral skin 33B. The side airbag device according to this embodiment comprises an airbag 37, a gas generator 38, an inner connection member 40A, an outer connection member 40B, and a clip 43.

The pad 32 includes a front pad 32A disposed in a front portion of the seat back 30 to form a backrest section, and a lateral pad 32B disposed adjacent to a lateral end portion of the front pad 32A. The lateral pad 32B extends rearwardly from a vicinity of the lateral end portion of the front pad 32A, and bends at an end of a back surface of the seat back 30 to extend inwardly along the back surface of the seat back 30.

A side frame 34 as a part of the seat frame 31 is disposed inside a lateral portion of the seat back 30 (in this embodiment, on a right side in a widthwise direction of the vehicle). The side frame 34 is disposed between the front pad 32A and the lateral pad 32B, while being sandwiched between the front and lateral pads 32A, 32B.

The side frame 34 includes a bottom portion 34a located inside the seat back 30 on the side of the back surface of the seat back 30, and a standing portion 34b standing frontwardly from an outer end of the bottom portion 34a. The side frame 34 has a clip-locking hole 34c (see FIG. 5A) formed in the bottom portion 34a to penetrate through the bottom portion 34a in a frontward-rearward direction of the vehicle.

A receiving space 35 is defined between the front and lateral pads 32A, 32B of the pad 32 and on a lateral side of the side frame 34. Further, a slit 36 is defined frontward of the receiving space 35 in such a manner that it is communicated with the receiving space 35 and an outside of the seat back 30. The slit 36 is a gap between the lateral end portion of the front pad 32A and a front end portion of the lateral pad 32B.

The side airbag 37 in a folded state is received in the receiving space 35. A rear portion of the airbag 37 is attached to the side frame 34. The gas generator 38 is installed inside the airbag 37. The gas generator 38 is supported by a support base 39. The support base 39 is attached to the side frame 34 via the airbag 37.

The skin 33 is divided into a front skin 33A provided in a position corresponding to the front pad 32A, and a lateral skin 33B provided in a position corresponding to the lateral pad 32B. The front skin 33A and the lateral skin 33B are breakably sewn together in a sewed portion 33c located at a position approximately corresponding to the slit 36.

Thus, as shown in FIG. 2, in the event of collision or the like, the side airbag 37 is inflated by a gas from the gas generator 38, and developed (for example, frontwardly) to the outside of the seat back 30 through the slit 36 between the front and lateral pads 32A, 32B in the lateral portion of the seat back 30, while breaking the sewn portion 33c between the front and lateral skins 33A, 33B.

The two connection members 40A, 40B are inserted in the slit 36 between the front and lateral pads 32A, 32B. Each of the connection members 40A, 40B is made of a material (e.g., woven fabric) which is flexible, low in stretchability and excellent in tensile strength, and formed in an elongate strip shape. In the inside of the seat back 30, one (inner connection member 40A) of the connection members is disposed to extend along a surface of the front pad 32A defining the slit 36 and the receiving space 35, and the other connection member (outer connection member 40B) is disposed to extend along a surface of the lateral pad 32B defining the slit 36 and the receiving space 35.

The inner connection member 40A is installed to extend through a region inward of the airbag 37 in the widthwise direction of the vehicle (on a left side in FIG. 1). The outer connection member 40B is installed to extend through a region outward of the airbag 37 in the widthwise direction of the vehicle (on a right side in FIG. 1). The inner connection member 40A is installed to extend through a region inward of the standing portion 34b, and the outer connection member 40B is installed to extend through a region outward of the standing portion 34b. The inner connection member 40A and the outer connection member 40B are disposed to surround the airbag 37.

An outer end portion 40a of the inner connection member 40A is attached to the front skin 33A at a position adjacent to the sewn portion 33c. An outer end portion 40b of the outer connection member 40B is attached to the lateral skin 33B at a position adjacent to the sewn portion 33c. An inner end portion 40c of the inner connection member 40A and an inner end portion 40d of the outer connection member 40B are fixed to the side frame 34 by the clip 43 described in detail later.

Figure 5A:
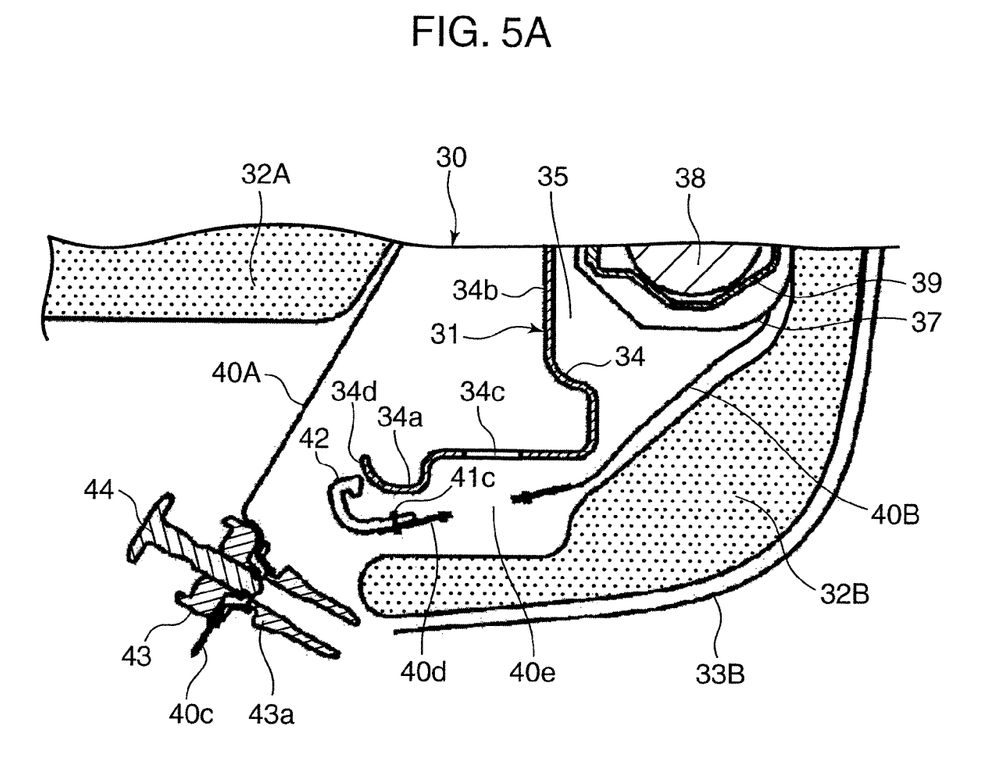
FIG. 5A is a fragmentary enlarged view of the side airbag device in FIG. 3.
Figure 5B:
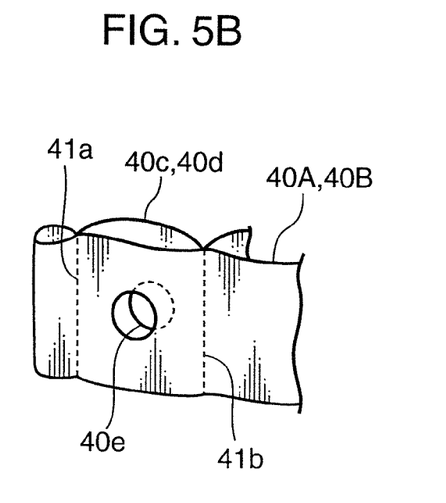
FIG. 5B is a perspective view showing the inner end portion of one of the inner and outer connection members.

As shown in FIG. 5B, each of the inner end portions 40c, 40d of the inner and outer connection members 40A, 40B is a folded region formed by folding a material for each of the connection members in a multi-layered manner (in this embodiment, a two-layered manner). A clip hole 40e is formed in the folded region of each of the inner end portions 40c, 40d to penetrate through the folded region. Portions of the material in the folded region of each of the inner end portions 40c, 40d are sewn together at positions (sewing positions 41a, 41b) on both sides of the clip hole 40e in a longitudinal direction (extending direction) of each of the connection members.

In the sectional view of FIG. 5A, for easy recognition of a position of the clip hole 40e provided in the inner end portion 40d of the outer connection member 40B, the illustration of a portion around the clip hole 40e in the inner end portion 40d is omitted. The position of the non-illustrated clip hole 40e is indicated by the leader line of the code 40e.

Figure 4:
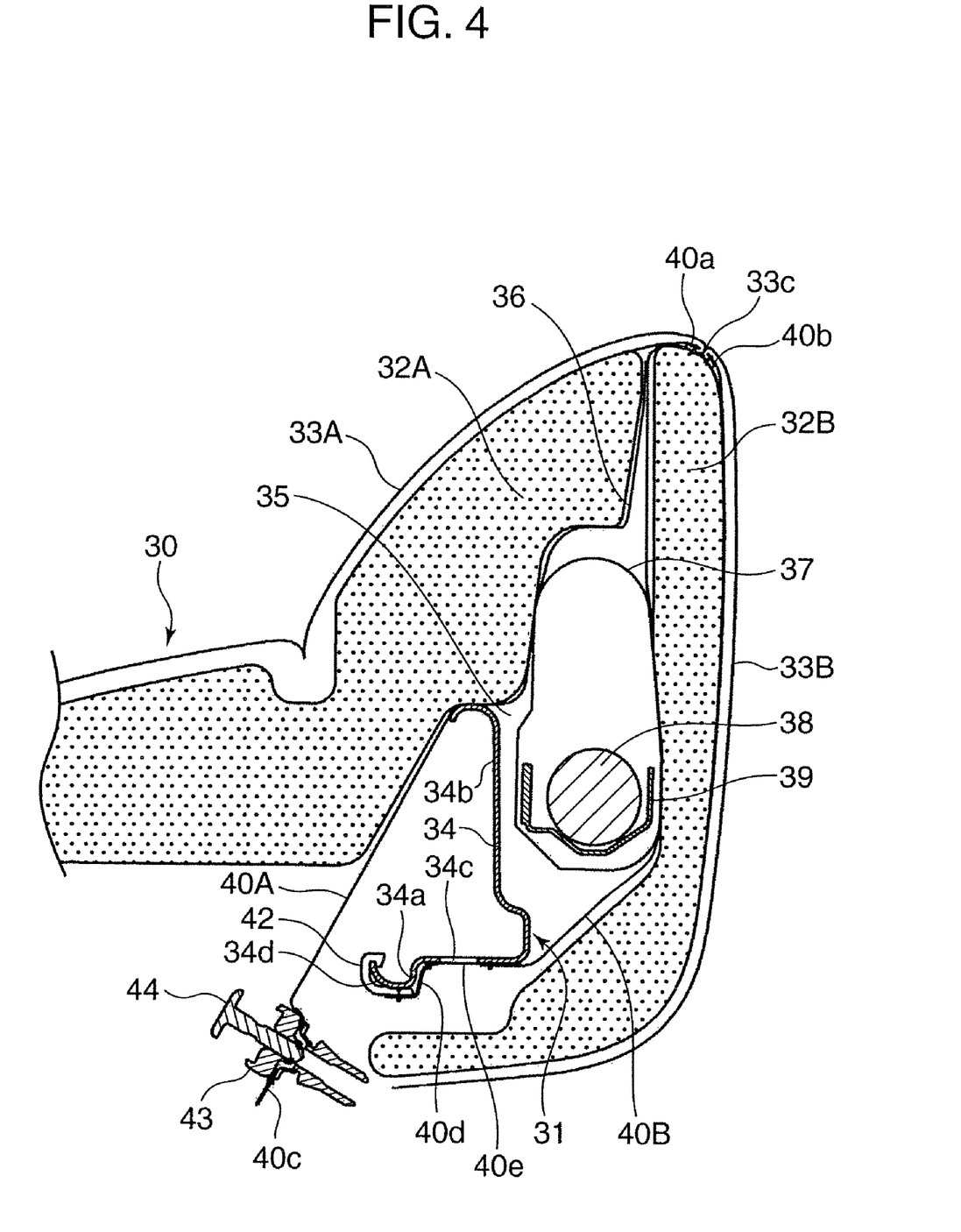
FIG. 4 is a horizontal sectional view of the side airbag device in FIG. 1, in a state just after a temporary locking hook 42 provided to the inner end portion of the outer connection member is locked to the seat frame.

As shown in FIG. 4, the inner end portion 40d and its adjacent portion of the outer connection member 40B are disposed in contact relation with a back surface of the bottom portion 34a of the side frame 34. A temporary locking hook 42 is attached to the inner end portion 40d of the outer connection member 40B.

As shown in FIG. 5A, the temporary locking hook 42 is fixed to the inner end portion 40d of the outer connection member 40B by sewing a base end portion of the temporary locking hook 42 and the inner end portion 40d together at a sewing position 41c. The temporary locking hook 42 has a hook-like shape, such as a U shape, lockable to an inner end region 34d (on a widthwisely inward side) of the bottom portion 34a of the side frame 34. The inner end region 34d of the bottom portion 34a has a curved shape conforming to the shape of the temporary locking hook 42.

For example, the clip 43 is made of a resin material. The clip 43 has a flexurally deformable locking pawl 43a, a depression formed in a base end of the locking pawl 43a, and a pin 44 capable of being pushed into and along the locking pawl 43a. Under a condition that the inner connection member 40A and the outer connection member 40B are overlapped on each other to allow the clip hole 40e of the inner connection member 40A and the clip hole 40e of the outer connection member 40B to be aligned with each other, the clip 43 is inserted into the aligned clip holes 40e, 40e and the clip-locking hole 34c. The clip 43 is inserted into the clip holes 40e, 40e and the clip-locking hole 34c from the side of the clip holes 40e, 40e.

In an operation of inserting the locking pawl 43a into the clip-locking hole 34c, the locking pawl 43a is gradually inserted into the clip-locking hole 34c while being flexurally deformed. Then, when the depression reaches the clip-locking hole 34c, the locking pawl 43a returns from the flexurally deformed state to its original state. In this state, the pin 44 is pushed toward the locking pawl 43a along locking pawl 43a. Thus, the pin 44 acts to keep the locking pawl 43a from being flexurally deformed inwardly, so that the clip 43 is locked so as not to be pulled out of the clip-locking hole 34c. In this manner, the respective inner end portions 40c, 40d of the connection members are fixed to the frame 34 by the clip 43.

Further, the side airbag device according to this embodiment has excellent operating efficiency in the following respects. In an operation of fixing the inner end portions 40c, 40d to the side frame 34 by the clip 43, the temporary locking hook 42 attached to the inner end portion 40d of the outer connection member 40B is firstly hooked to the inner end region 34d of the bottom portion 34a of the side frame 34, as shown in FIG. 4. Thus, the inner end portion 40d of the outer connection member 40B is temporarily locked to the bottom portion 34a. In this state, the inner end portion 40d of the outer connection member 40B is kept under a condition that a position of the clip hole 40e of the outer connection member 40B is aligned with a position of the clip-locking hole 34c of the side frame 34.

Meanwhile, the clip 43 is preliminarily fitted into the clip hole 40e of the inner end portion 40c of the inner connection member 40A, as shown in FIG. 5A. Then, the clip 43 is inserted into the clip hole 40e of the inner end portion 40d of the outer connection member 40B and the clip-locking hole 34c of the side frame 34, and locked to the clip-locking hole 34c in the aforementioned manner. Through the above operation, the inner end portions 40c, 40d of the inner and outer connection members are fixed to the side frame 34, as shown in FIG. 1.

Figure 6:
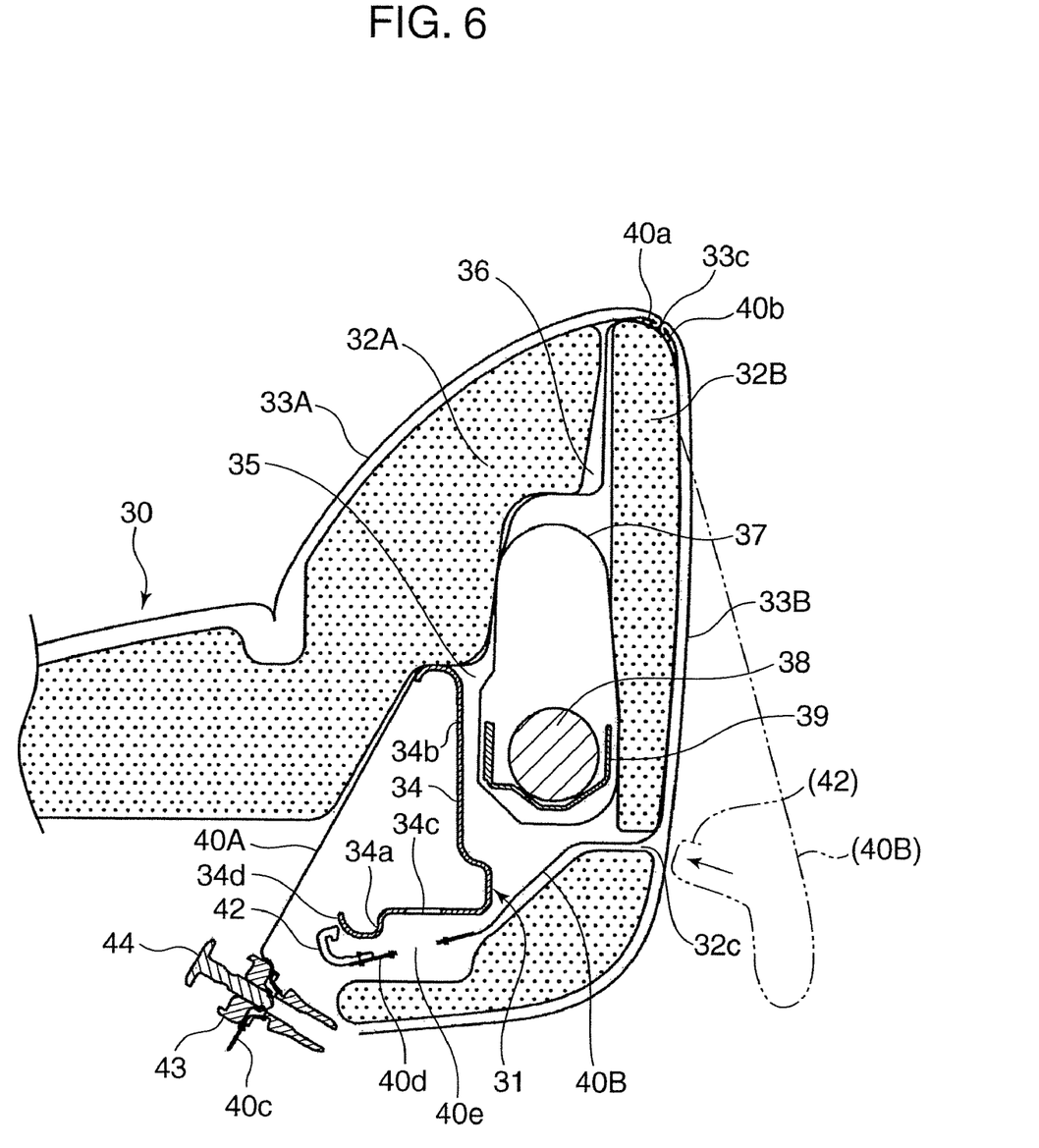
FIG. 6 is a horizontal sectional view showing one modification of the side airbag device.

The above description has been made based on an example where each of the inner and outer connection members 40A, 40B are inserted into the slit 36 between the front pad 32A and the lateral pad 32B. Alternatively, the outer connection member 40B may be installed to extend through between the lateral pad 32B and the lateral skin 33B, as shown in FIG. 6. In this case, a cut 32c is formed in the lateral pad 32B to penetrate between inner and outer surfaces of the lateral pad 32B in the widthwise direction of the vehicle.

In the operation of fixing or assembling the inner end portions 40c, 40d of the inner and outer connection members 40A, 40B to the side frame 34 by using the clip 43, the temporary locking hook 42 attached to the inner end portion 40d of the outer connection member 40B is passed through the cut 32c of the lateral pad 32B inwardly from outside the lateral pad 32B as shown by a chain double dashed line in FIG. 6. Subsequently, the temporary locking hook 42 is temporarily locked to the inner end region 34d of the bottom portion 34a of the side frame 34, in the same manner as described above.

In this modified embodiment designed to pass the inner end portion 40d of the outer connection member 40B through the cut 32c of the lateral pad 32B in the above manner, the temporary locking hook 42 harder than the outer connection member 40B is firstly passed through the cut 32c, to allow the outer connection member 40B connected to the temporary locking hook 42 to also be passed through the cut 32c. This makes it possible to facilitate the operation of passing the outer connection member 40B through the cut 32c.

A summary of the above embodiment is as follows.

(1) In the side airbag device for the vehicle seat according to the above embodiment, the clip is inserted in the respective clip holes of the inner and outer connection members and the clip-locking hole under the condition that the inner end portion of the inner connection member and the inner end portion of the outer connection member are overlapped on each other to allow the clip hole of the inner connection member and the clip hole of the outer connection member to be aligned with each other. The clip is locked to the clip-locking hole.

In the above embodiment, the inner end portions of the inner and outer connection members are fixed to the side frame by inserting the clip into the clip holes of the inner end portions of the connection members and the clip-locking hole of the side frame, and locking the clip to the clip-locking hole. Thus, the inner end portions of the connection members can be fixed to the side frame through one-touch operation, which makes it possible to quickly perform the fixing operation. In addition, the inner end portions of the connection members can be fixed to the side frame by using the single piece of clip, which makes it possible to reduce the number of components to facilitate a reduction in cost, as compared with the conventional side airbag device illustrated in FIG. 7A which requires two bolt/nut sets.

(2) Preferably, in the above side airbag device, the inner end portion of each of the inner and outer connection members has a folded region formed by folding a material for each of the inner and outer connection members, wherein the clip hole is formed to penetrate through the folded region.

In this case, the inner end portion of each of the inner and outer connection members has the folded region formed by folding the material in a multi-layered manner, so that the strength of the clip hole is enhanced.

(3) More preferably, portions of the material in the folded region are sewn together at positions on both sides of the clip hole in the extending direction of each of the inner and outer connection members.

In this case, the portions of the material in the folded region of the inner end portion of each of the inner and outer connection members are sewn together at sewing positions on both sides of the clip hole in the longitudinal direction of each of the inner and outer connection members, so that the strength of the clip hole is further enhanced.

(4) Preferably, the above side airbag device comprises a temporary locking hook provided to the inner end portion of one of the inner and outer connection members and adapted to allow the inner end portion to be temporarily locked to the seat frame in a position where the clip hole of the inner end portion is aligned with the clip-locking hole.

In this case, the inner end portion of a first one of the inner and outer connection members can be temporarily locked to the seat frame by the temporary locking hook. Further, in the temporarily locked state, a position of the clip hole of the inner end portion can be aligned with a position of the clip-locking hole of the side frame. This makes it possible to facilitate an operation of allowing the clip hole of the first one of the inner and outer connection members to be aligned with the clip-locking hole of the side frame.

Meanwhile, the clip may be preliminarily fitted into the clip hole of the inner end portion of a remaining second one of the inner and outer connection members. Thus, the fixing operation can be completed simply by inserting the clip into the clip-locking hole of the side frame from the side of the clip hole of the inner end portion of the first one of the inner and outer connection members. This makes it possible to facilitate an operation of allowing the clip hole of the second one of the inner and outer connection members to be aligned with the clip-locking hole of the side frame.

This application is based on Japanese Patent Application No. 2009-205641, filed on Sep. 7, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A side airbag device used in a seat for a vehicle, wherein the seat includes: a seat frame; a pad having a receiving space and a slit and attached to the seat frame; and a skin having a sewn portion and covering a surface of the pad, the side airbag device comprising:
   a gas generator;
   an airbag attached to the seat frame, received in the receiving space and adapted to be inflated and deployed outwardly from the receiving space through the slit by a gas from the gas generator, to break the sewn portion;
   an inner connection member having an inner end portion fixed to the seat frame and an outer end portion fixed to the sewn portion, the inner connection member being installed to extend through a region inward of the airbag in a widthwise direction of the vehicle, and formed with a clip hole in the inner end portion thereof;
   an outer connection member having an inner end portion fixed to the seat frame and an outer end portion fixed to the sewn portion, the outer connection member being installed to extend through a region outward of the airbag in the widthwise direction of the vehicle, and formed with a clip hole in the inner end portion thereof;
   a clip inserted in the respective clip holes of the inner and outer connection members and a clip-locking hole provided in the seat frame, under a condition that the inner end portion of the inner connection member and the inner end portion of the outer connection member are overlapped on each other to allow the clip hole of the inner connection member and the clip hole of the outer connection member to be aligned with each other, wherein the clip is locked to the clip-locking hole; and
   a temporary locking hook provided on the inner end portion of one of the inner and outer connection members and adapted to allow the inner end portion to be temporarily locked to the seat frame in a position where the clip hole of the inner end portion is aligned with the clip-locking hole.

2. The side airbag device as defined in claim 1, wherein the inner end portion of each of the inner and outer connection members has a folded region formed by folding a material for each of the inner and outer connection members, and wherein the clip hole of each of the inner and outer connection members is formed to penetrate through the folded region.

3. The side airbag device as defined in claim 2, wherein portions of the material in the folded region are sewn together at positions on both sides of the clip hole in an extending direction of each of the inner and outer connection members.

4. A side airbag device used in a seat for a vehicle, wherein the seat includes: a seat frame having a clip locking hole therein; a pad having a receiving space and a slit and attached to the seat frame; and a skin having a sewn portion and covering a surface of the pad, the side airbag device comprising:
   a gas generator;
   an airbag attached to the seat frame, received in the receiving space and adapted to be inflated and deployed outwardly from the receiving space through the slit by a gas from the gas generator, to break the sewn portion;
   an inner connection member having an inner end portion fixed to the seat frame and an outer end portion fixed to the sewn portion, the inner connection member being installed to extend through a region inward of the airbag in a widthwise direction of the vehicle, and formed with a clip hole in the inner end portion thereof, the clip hole of the inner connection member being substantially aligned with the clip-locking hole of the seat frame;
   an outer connection member having an inner end portion fixed to the seat frame and an outer end portion fixed to the sewn portion, the outer connection member being installed to extend through a region outward of the airbag in the widthwise direction of the vehicle, and formed with a clip hole in the inner end portion thereof, the clip hole of the outer connection member being substantially aligned with the clip-locking hole of the seat frame and the clip hole of the inner connection member; and
   a clip inserted in the respective clip holes of the inner and outer connection members and the clip-locking hole of the seat frame, the clip having a flexurally deformable locking pawl and a depression formed in a base end of the locking pawl, the locking pawl being configured for flexurally deforming during insertion through the substantially aligned clip holes and the clip-locking hole and returning from a flexurally deformed state when the depression reaches the clip-locking hole.

5. The side airbag device as defined in claim 4, further comprising a pin configured to be pushed into and along the locking pawl when the locking pawl returns from the flexurally deformed state and preventing the locking pawl from returning to the flexurally deformed state.

6. The side airbag device as defined in claim 4, wherein the inner connection member and the outer connection member are flexible.

7. The side airbag device as defined in claim 4, wherein the airbag is on an outer side of the seat frame in the widthwise direction of the vehicle, and the clip is on an inner side of the seat frame in the widthwise direction of the vehicle and spaced from the air bag.

* * * * *